(12) United States Patent
Beuchle et al.

(10) Patent No.: US 8,382,892 B2
(45) Date of Patent: *Feb. 26, 2013

(54) SINGLE-PHASE HYDRAULIC BINDER, METHODS FOR THE PRODUCTION THEREOF AND BUILDING MATERIAL PRODUCED THEREWITH

(75) Inventors: Guenter Beuchle, Karlsruhe (DE); Peter Stemmermann, Karlsruhe (DE); Uwe Schweike, Karlsruhe (DE); Krassimir Garbev, Eggenstein-Leopoldshafen (DE)

(73) Assignee: Karlsruher Institut fuer Technologie, Karlsruhe (DE)

( * ) Notice: Subject to any disclaimer, the term of this patent is extended or adjusted under 35 U.S.C. 154(b) by 331 days.

This patent is subject to a terminal disclaimer.

(21) Appl. No.: 12/670,098

(22) PCT Filed: Jul. 16, 2008

(86) PCT No.: PCT/EP2008/005784
§ 371 (c)(1),
(2), (4) Date: Jan. 21, 2010

(87) PCT Pub. No.: WO2009/015769
PCT Pub. Date: Feb. 5, 2009

(65) Prior Publication Data
US 2011/0041737 A1 Feb. 24, 2011

(30) Foreign Application Priority Data
Jul. 27, 2007 (DE) .......................... 10 2007 035 257

(51) Int. Cl.
*C04B 7/02* (2006.01)
(52) U.S. Cl. ........................................ 106/713
(58) Field of Classification Search ........... 106/713, 106/724
See application file for complete search history.

(56) References Cited

U.S. PATENT DOCUMENTS

| | | | |
|---|---|---|---|
| 3,066,031 A | 11/1962 | Schifferle | |
| 4,217,143 A | 8/1980 | Reich et al. | |
| 4,605,443 A | 8/1986 | MacDowell | |
| 5,804,175 A | 9/1998 | Ronin | |
| 2004/0089203 A1 | 5/2004 | Ronin | |
| 2010/0186634 A1 * | 7/2010 | Beuchle et al. | 106/638 |
| 2010/0206199 A1 * | 8/2010 | Beuchle et al. | 106/801 |

FOREIGN PATENT DOCUMENTS

| | | |
|---|---|---|
| DE | 266 277 C | 10/1913 |
| DE | 2 222 545 | 11/1972 |
| DE | 117 437 A1 | 1/1976 |
| DE | 195 48 645 A1 | 6/1997 |
| DE | 10 2005 018 423 A1 | 10/2006 |
| EP | 0 500 840 B1 | 3/1999 |
| WO | WO 2007/017142 A | 2/2007 |

OTHER PUBLICATIONS

Sun et al., "29 Si NMR Study of the Hydration of Ca3SiO5 and beta-Ca2SiO4 in the Presence of Silica Fume", Journal of the American Ceramic Society, vol. 82, No. 11, 1999, pp. 3225-3230.
Garbev et al., "Structural Features of C-S-H (I) and its Carbonation in Air—A Raman Spectroscopic Study, Part 1: Fresh Phases", Journal of the American Ceramic Society, vol. 90, No. 3, Mar. 2007, pp. 900-907.
Friedrich Wilhelm Locher: "Cement Principles of Production and Use", 2006, Verlag BAU + Technik GMBH, Duesseldorf, p. 354-356.
Boudaoud et al., "Etudes des effets du cobroyage d'un sable et d'un clinker sur les proprietes d'un beton de Sable", Materials and Structures/ Materiaux Et Constructions, No. 35, Jun. 2002, pp. 310-316.

* cited by examiner

*Primary Examiner* — Paul Marcantoni
(74) *Attorney, Agent, or Firm* — Muncy, Geissler, Olds & Lowe, PLLC

(57) ABSTRACT

The invention relates to a monophase amorphous hydraulic binder containing silicon, calcium and oxygen atoms in an arrangement comprising silicate building units having an average connectedness of at least $Q^1$, with none or a part of the calcium atoms being substituted for by a metal atom $M[6]^{x+}$ sixfold or higher-coordinated with oxygen and/or none or no more than 45 atomic percent of the silicon atoms being substituted for by a metal atom $M[4]^{y+}$ tetrahedrally coordinated with oxygen, the molar ratio of $$[CaO+(x/2)\cdot(M[6]^{x+}O_{x/2})]:[SiO_2+M[4]^{y+}O_{y/2}]$$

having a value of 0.2 to 1.5, and the binder having less than 3.5% by weight of water, as well as a mixture containing this binder.
Furthermore, the invention relates to methods for manufacturing the binder or a mixture containing this binder by reaction grinding a starting material containing silicate building units having a connectedness of $Q^0$ to $Q^2$, with a solid silicate raw material having a connectedness of the silicate building units of $Q^3$ to $Q^4$ and optionally drying the monophase hydraulic binder to a water content of below 3.5% by weight. Finally, the invention relates to a building material made by setting the binder or a mixture containing this binder with water and subsequent hardening.

17 Claims, No Drawings

SINGLE-PHASE HYDRAULIC BINDER, METHODS FOR THE PRODUCTION THEREOF AND BUILDING MATERIAL PRODUCED THEREWITH

This application is a national stage of International Application No.: PCT/EP2008/005784, which was filed on Jul. 16, 2008, and which claims priority to German Patent Application No.: 10 2007 035 257.5 which was filed in Germany on Jul. 27, 2007, and which are both herein incorporated by reference.

The invention relates to a monophase hydraulic binder, a mixture containing such binder, a method for manufacturing the binder and the mixture as well as a building material manufactured with the binder or the mixture.

Hydraulic reactivity describes the reaction of a binder with water so that a solid material is formed. The definition of this process is made on the basis of the conventionally known hydraulic binders, such as Portland cement. According to Härig, Günther, in Klausen, *Technologie der Baustoffe [Technology of Building Materials]*, C. F. Müller Verlag, Heidelberg, 1996, p. 53, hydraulic binders harden in air as well as under water after water has been added. According to H. F. W. Taylor, *The Chemistry of Cements*, Academic Press, London 1964, p. 2 et seq., cement is a hydraulic binder which, mixed with water to a paste (cement paste), independently starts to stiffen and hardens into cement stone due to chemical reactions between the water and the compounds present in the cement. In this process, the stiffening and hardening depend neither on drying nor on reactions with the $CO_2$ from the air. Therefore, the reaction proceeds in air as well as under water.

Moreover, latent hydraulic binders (so-called pozzolanic binders) are known. According to Härig (see above) they harden only in the presence of an activator after water has been added. In order to start the setting reaction, e.g. lime hydrate or Portland cement are added; however, there will be no independent reaction. Typical examples of such latent hydraulic binders are granulated blast-furnace slags having a mass ratio $(CaO+MgO):SiO_2$ of $>1$ (EN 197—1:2000, section 5.2.2).

Conventionally known hydraulic binders based on silicates do not contain any molecular water, their hydraulic components contain no hydrogen in their summation formula, and the hydraulic components for the most part consist of crystalline alkali (earth) silicates. According to H. F. W. Taylor, *The Chemistry of Cements*, Academic Press, London 1964, p. 2 et seq., the silicate ions of the hydraulically active phases are present in the form of single isolated or monomeric silicate tetrahedra ($Q^0$). An exception is the rare phase belinite, which is a cyclosilicate and contains chlorine. In belinite, each silicate tetrahedron is linked with two further silicate tetrahedra ($Q^2$) via common oxygens. All conventionally known hydraulic binders based on silicates contain a molar ratio of $CaO:SiO_2$ of at least two.

Such hydraulic binders are used purely or mixed with other materials as cement in various ways for manufacturing solid building materials such as concrete, mortar or in special binders. Moreover, two further types of mostly higher condensed silicate and amorphous (but not hydraulic) binders are of technical importance, namely water glasses on the one hand and latent hydraulic or pozzolana materials, such as blast-furnace slags, fly ashes, etc., on the other hand.

1. Cement is manufactured by burning calcium carbonate and a silicate carrier at approximately 1,450° C. together to a product which is called (cement) clinker and substantially consists of the hydraulically reactive clinker phases tricalcium silicate (alite, $Ca_3SiO_5$), dicalcium silicate (belite, particularly $\beta$-$Ca_2SiO_4$) and on a subordinate level tricalcium aluminate $Ca_3Al_2O_6$ and calcium aluminate ferrite $Ca_4(Al,Fe)_4O_{10}$. By grinding and adding further materials, particularly gypsum or anhydrite as reaction retarders, so-called Portland cement (CEM I) is obtained. CEM I is often ground with latent hydraulic silicates to the cement types CEM II to CEM V. The grinding produces a higher surface which accelerates the speed of the hydraulic reaction. According to DIN 1164, Portland cement consist of 61% to 69% of calcium oxide CaO, 18% to 24% of silicon dioxide $SiO_2$, 4% to 8% of aluminum oxide $Al_2O_3$ and 1% to 4% of iron oxide $Fe_2O_3$.

2. Furthermore, so-called water glasses are manufactured. These are solid, but water-soluble glasses made from alkali oxides and $SiO_2$, which are melted at approximately 1,400° C. Water glasses are used as concentrated, strongly alkaline solutions or powders.

3. Moreover, silicate starting materials can be caused to react with a lye to a binder, with alkali hydroxides being used as lyes. The resulting product is mostly called a geopolymer, however, it is only of small economic importance.

Types 2 and 3, water glasses and geopolymers, are to be regarded as hydraulic binders only to a limited degree in the sense of the definitions mentioned at the beginning as they either already exist as solutions, that is, not solid, and do not harden, respectively, under water due to their high water solubility (alkali silicate) or are not reactive as solid materials and need additives such as CEM I or lye to set the hydraulic reaction in motion. Their manufacture requires both particular starting materials and respective several laborious procedural steps which make their manufacture expensive. At the same time, their compatibility with various additives is extremely limited due to the very high pH values and it is not possible to effectively influence the reaction speed, which commonly is very slow, in particular, it is not possible to accelerate it. Due to the limited processability (slow hardening, strongly alkaline reaction) and the low strength their range of application is limited.

The hydraulic binder which is best known and used most often is cement, in particular Portland cement. According to H. F. W. Taylor, *Cement Chemistry*, Academic Press, London 1990, p. 64 et seq., the burning process required for the manufacture of the preproduct cement clinker at temperatures of up to about 1,450° C. with a theoretical reaction enthalpy of +1,761 kJ per kg of cement clinker uses especially much energy. The lion's share of the required energy is taken up by the calcination (or decarbonation) of calcium carbonate originating from limestone, calcareous clay or other calcareous materials. The reaction releases $CO_2$ and contributes to the overall reaction in a strongly endothermic manner with an enthalpy of reaction of +2,138 kJ per kg of cement clinker.

About 1.2 kg of lime are needed to manufacture 1 kg of Portland cement. Additionally, in order to create the hydraulically active clinker phases alite, belite, tricalcium aluminate and calcium aluminate ferrite it is necessary to partly melt the starting materials. As a sum of the theoretically required energy, the heat losses, the grinding energy, etc., an actual overall energy consumption of about +4,300 kJ per kg is the result for the end product Portland cement.

During the manufacture of Portland cement, considerable amounts of $CO_2$ are released from the calcium carbonate containing materials, which in total add up to about 850 g of $CO_2$ per kg of clinker.

The reaction of Portland cement with water leads to solidification (hardening). According to H. F. W. Taylor, *Cement Chemistry*, Academic Press, London 1990, p. 218, C—S—H gels, that is, poorly crystalline calcium silicate hydrates, as well as calcium aluminate hydrates and portlandite $Ca(OH)_2$ are produced. The latter is a necessary consequence of the setting reaction and occurs at a proportion of about 20% by weight in the set, i.e., hardened cement stone.

It is not possible to substantially lower the overall content of calcium in Portland cement in general and particularly in the preproduct clinker because otherwise the hydraulic reactivity will strongly decrease. The overall content of calcium expressed as a molar ratio of Ca:Si which incidentally is identical to the molar ratio of $(CaO):(SiO_2)$ is always at 3.0+/−0.2. The binder matrix of C—S—H gel present in the cement stone made from Portland cement which substantially results from the reaction of tricalcium silicate $Ca_3SiO_5$, has a molar ratio of Ca:Si of 1.7 to 1.8. The excess CaO is present as portlandite $Ca(OH)_2$ after the hydration.

Portlandite contributes to the mechanical stability of the building material only to a minor degree. Rather, portlandite determines the pH value of the building material in during service life of the cements, which will then be about pH 12.5. Acid attacks are buffered by portlandite at first; however, once it has been consumed, for example, by having been transformed into $CaCO_3$ by $CO_2$, the pH value will decrease and the binder matrix made of C—S—H gel will be attacked and decomposed.

It is possible to inhibit the reaction by creating a structure as dense as possible and thus slow down the material transport. However, the dissolution of portlandite itself will generate new opportunities for attack. The buffering of the pH value in cement by portlandite thus represents a limited corrosion protection for constructional steel. In contrast thereto, the high alkalinity generated by portlandite prevents the use of base- or alkali-sensitive additives in cement-bonded building materials, such as organic fibres. A pH value of higher then 9.5 would suffice for corrosion protection.

Portland cement releases a high enthalpy of reaction when it sets, which substantially results from the formation of portlandite and leads to heat accumulations in large, massive or voluminous building elements. The temperature build-up per unit of time may be decreased by decelerating the reaction rate by means of grain enlargement, additive agents or dilution with fly ashes. However, this also slows down the strength development.

The strength of cement stone is determined by the main component C—S—H gel which is only about 50% by weight. Therefore, the effective energy consumption for manufacturing the strength-determining constituents of cement stone made from Portland cement is approximately 8,600 kJ per kg. The other half of the cement stone, essentially calcium aluminate hydrates and portlandite, hardly contributes to the strength of the material or building material, and with regard to strength it is an undesired by-product. The amount of portlandite may be reduced subsequently in technical systems by admixing micro-silica or latent hydraulic substances. Excess portlandite will then slowly react to additional calcium silicate hydrates by consuming micro-silica. However, this process is laborious and expensive.

Moreover, C—S—H gels may incorporate various amounts of calcium. When the calcium content increases, the connectedness of the associated silicate building units will decrease and so will their contribution to the strength of the building material as well as their chemical stability. In set Portland cement stone the C—S—H gels are present with a molar ratio of Ca:Si of 1.7 to 1.8. In contrast to that, calcium silicate hydrates exist in a range of the molar ratio of Ca:Si of 0.5 to 3.0. This is proven by naturally occurring or synthetically produced solid materials.

Due to the reasons as mentioned it would make sense to aim at C—S—H gels having a low calcium content in a hardened hydraulic binder in general and in cement stone made from Portland cement in particular. However, a slight reduction of the calcium content during the production of Portland cement clinker in a rotary kiln already results in less reactive calcium silicates and an increase in the content of belite in particular. A further decrease of the calcium content leads to hydraulically inactive products such as wollastonite β-$CaSiO_3$, pseudowollastonite α-$CaSiO_3$ or rankinite $Ca_3Si_2O_7$. In this manner, that is, on a "clinker route", it is not possible to obtain hydraulic binders low in calcium.

In *Mechano-radicals produced from ground quartz and quartz glass*, Powder Tech. 85 (1995) p. 269, Hasegawa et al. describe changes occurring during the grinding of quartz by detecting defective portions on the surface of the quartz by spectroscopic methods. In this process, no hydraulic binders are produced.

In *Modification of kaolinite surfaces through mechanochemical activation with quartz: a diffuse reflectance infrared fourier transform and chemometrics study*, Appl. Spectroscopy 60 (2006), p. 1414, Carmody et al. prove the changes of kaolinite surfaces by grinding them together with quartz. This case does not produce a new phase which is hydraulically reactive.

In *Mechanism for performance of energetically modified cement versus corresponding blended cement*, Cem. Concr. Res. 35 (2005), p. 315, Justnes et al. describe the grinding of cement together with quartz and the reduction of the grain size of both mixture partners occurring therein. Again, no new phase is generated. Quartz is explicitly called a non-reactive filler.

U.S. Pat. No. 3,066,031 A discloses a cementitious binder and a method for the manufacture thereof which is based on grinding CaO and oxidic materials such as $SiO_2$ and/or $Al_2O_3$ together. The essential constituent CaO is used in the form of burnt lime. The grinding transforms the CaO share by at least 50% into a form which releases less heat than pure CaO in a reaction with water. Apart from the activator CaO, the binder contains ground latent hydraulic aluminum silicates. U.S. Pat. No. 4,217,143 A describes a particular embodiment of this method.

U.S. Pat. No. 4,605,443 A discloses an amorphous hydraulic binder consisting of a ground reactive glass produced from a molten phase, which has a high content of $Al_2O_3$ and a molar ratio of Al:Si of higher than 0.95. The hydraulic behaviour is caused by the high aluminum content.

DE 10 2005 018 423 A1 discloses a method for manufacturing structural components, the binder used therefore being completely hydrated compounds, the solidification of which is not made hydraulically but by pressing. In this process, silanol units condense by removing water.

DE 22 22 545 B2 discloses a method for manufacturing a water-containing calcium silicate of the xonotlite type, the xonotlite being crystalline. Due to the hydrothermal manufacture, the amorphous preproduct described in this patent is a hydrate which does not harden hydraulically.

EP 0 500 840 B1 discloses tectoalumo silicate cement as well as an appropriate manufacturing method, the tectoalumo silicate having a connectedness of $Q^4$. Moreover, the hydraulic hardening of corresponding compounds is not based on the formation of C—S—H phases.

According to DE 195 48 645 A1, which describes a method for manufacturing secondary raw materials from demolition material, concrete demolition material is activated by grinding. However, the grinding is made such that no hydraulic product is formed, but a product which may be used as a cement raw mix constituent. If concrete demolition material is used the starting component moreover contains a sulfate carrier which as a reaction product should prevent the manufacture of a monophase product.

Starting therefrom, it is the object of the present invention to provide a monophase hydraulic binder, a mixture containing such binder, methods for the manufacture of the building material and the mixture as well as a building material which has been produced with the binder or the mixture which do not have the aforementioned drawbacks and limitations.

In particular, a monophase hydraulic binder based on silicate and a mixture containing this binder are to be provided, which, as compared to conventional Portland cement and to hydraulic or latent hydraulic binders, respectively, lowers the energy consumption during the manufacture of the binder, i.e. which is manufactured at low temperatures, lowers the amount of the $CO_2$ emissions, shows a lower total release or a more uniform release of heat during hydration, and achieves higher durability and strength of building materials and materials, respectively, made using this binder.

This object is achieved by the features of claim 1 with regard to the monophase hydraulic binder, by the feature of claim 6 with regard to the mixture, by the features of any one of claims 8 to 10 with regard to the manufacturing method and by the features of claim 14 with regard to the building material. The subclaims each describe advantageous embodiments of the invention.

The inventive hydraulic binder is a hydraulically active silicate compound containing calcium, silicon, and oxygen. Other elements may also be constituents of the binder and are distinguished according to the type of their incorporation: alkali metals, in particular sodium; alkaline earth metals, in particular magnesium, or other divalent cations, in particular Fe[+II] and manganese; trivalent cations, in particular Al[+III], are incorporated six-coordinated or higher with oxygen as $M[6]^{x+}$, the $M[6]^{x+}$ partly substituting for the calcium. Elements tetrahedrically coordinated by oxygen, in particular phosphorous, aluminum or $Fe^{3+}$, form oxygen anions and are incorporated as phosphate, aluminate or ferrate on tetrahedral positions as $M[4]^{y+}$, substituting for silicon by no more than 45 atomic percent. The amphoteric aluminum is suitable for both variants, just like magnesium. The exponents x+ and y+ respectively indicate the charge of the relevant cation.

The stoichiometry of the inventive hydraulic binder is defined by the range of the molar ratio of Ca:Si of 0.2 to 1.5, particularly preferable of 0.3 and up to below 1.5. The components oxygen and calcium, respectively, and further elements provide for the charge equalibration. In case that a part of the calcium or silicon atoms is replaced by the substituents $M[6]^{x+}O_{x/2}$ and $M[4]^{y+}O_{y/2}$, respectively, the modified molar ratio $[CaO+(x/2).(M[6]^{x+}O_{x/2})]:[SiO_2+M[4]^{y+}O_{y/2}]$ will be indicated instead of the simple molar ratio of Ca:Si, which is identical to the molar ratio of $(CaO):(SiO_2)$. The water content is below 3.5% by weight.

Following X-ray diffraction studies (X-ray powder diffractometry), the binder turns out to be X-ray amorphous, i.e. it is very strongly disordered.

Silicate ions consist of oxygen tetrahedra, the center of which is occupied by a tetrahedrically coordinated silicon. The silicate tetrahedra thus structured are linked with each other via common oxygen atoms. Silicon atoms may be substituted for by aluminum atoms in higher proportions and by boron, germanium, titanium, iron, beryllium or phosphorous atoms in lower proportions. The structure of the silicate atoms in the inventive hydraulic binder is characterized by a variable linkage of the tetrahedra.

Studies with $^{29}Si$ solid state NMR spectroscopy showed a broad distribution of the silicate connectedness: NMR signals occurred with the typical chemical shifts for $Q^0$ (monomeric silicate tetrahedra) via $Q^1$, $Q^2$, $Q^3$ to $Q^4$. The exponent indicates the number of tetrahedral neighbors linked to the observed tetrahedron via common oxygens: $Q^1$ describes a silicate dimer or the terminal silicate tetrahedra in a chain arrangement with $Q^2$ chain links; $Q^3$ and $Q^4$ correspond to silicate tetrahedra with three and four silicate tetrahedra as neighbors, respectively. The discovered distribution width of the monophase hydraulic binder has an average connectedness of at least $Q^1$ and does not only prove the occurrence of various types of connectedness $Q^n$ but also a high disorder of the individual connectedness types.

It is possible to substitute in part silicon atoms by atoms of other network forming elements, in particular of aluminum, boron, germanium, phosphorous, iron, beryllium or titanium. Of particular relevance is the substitution by aluminum which may reach a maximum substitution of 45 atomic percent of Si by Al.

The calcium atoms are present in the form of $Ca^{2+}$ ions as bonding partners of the negatively charged silicate units. It is possible to partially substitute them by Na, K, Li, Mg, Sr, Ba, Mn, Fe[+II] or Al[+III] atoms.

Thus, the present invention relates to a monophase hydraulic binder consisting of hydraulically active calcium silicate. In comparison to Portland cement this binder contains less calcium and less calcium-substituting elements, respectively, such that the molar ratio $[CaO+(x/2).(M[6]^{x+}O_{x/2})]:[SiO_2+M[4]^{y+}O_{y/2}]$ is lower. This hydraulic binder is manufactured by grinding from starting materials which are on average produced at lower temperatures than cement clinker so that energy consumption and carbon dioxide emissions are reduced.

Furthermore, the present invention relates to a mixture comprising a proportion of the inventive monophase hydraulic binder. Preferably, the proportion is at least 10% by weight, particularly preferably at least 25% by weight, above all preferably at least 50% by weight.

As is known from Portland cement, the setting and also the hardening are carried out by mixing with water and optionally take place under water. The hydration creates a mechanically solid building material. The hydraulic reaction of the inventive hydraulic binder does not produce portlandite $Ca(OH)_2$, at no time can it be detected by X-ray diffraction. Moreover, the setting reaction proceeds with a lower release of heat than during the hydration of Portland cement. As already known in case of Portland cement, the setting speed can be adjusted in a wide range by substituting various elements, varying the processing (e. g. grinding) as well as by surface-active additives, such as organic additives. The maximum of the heat of hydration will then be reached after a period of time of several minutes or only after several days.

During setting the inventive hydraulic binder reacts to a calcium silicate hydrate C—S—H phase. In this process the connectedness of the silicate building units changes on the molecular level, solidification takes place on the macroscopic level. Depending on the composition of the starting material, the hydration product may optionally enclose further alkali metals, alkaline earth metals or other elements such that a calcium silicate hydrate having a molar ratio of Ca:Si and a modified molar ratio of $[CaO+(x/2).(M[6]^{x+}O_{x/2})]:[SiO_2+M[4]^{y+}O_{y/2}]$ smaller than 1.5 is generated. In contrast thereto, set Portland cement consists of a C—S—H gel (cement gel)

having a molar ratio of Ca:Si of 1.7 to 1.8 and additionally contains portlandite $Ca(OH)_2$.

The building material manufactured by the setting reaction according to the invention is chemically more stable than Portland cement stone due to the absence of portlandite, due to the lower molar ratio of Ca:Si as compared to cement stone made from Portland cement and due to the higher connectedness of the silicate building units. The compressive strength measured after 28 days exceeds 20 N/mm². This value is within the order of magnitude of the European standard EN 197 for cements indicating 3 different classes for strength of 32.5, 42.5, and 52.5 N/mm².

If the inventive binder contains less than 1% of $Na_2O$, it may be reacted to an inventive building material, together with alkali-sensitive additives, such as inorganic or organic fibres with low alkali durability.

The manufacture of the inventive monophase hydraulic binder or a mixture containing the inventive monophase hydraulic binder is made by co-grinding (reaction grinding) a preproduct containing calcium, silicon and oxygen having monomeric or dimeric silicate building units (i. e. a calcium silicate) with a solid silicate raw material having a high connectedness, such as quartz or quartz sand.

In this case the first starting material is characterized by the chemical elements of calcium, silicon and oxygen which are present in the form of monomeric or dimeric silicate units.

The second starting material is a silicate solid material characterized by a high connectedness of the silicate tetrahedra of $Q^3$ to $Q^4$. Furthermore, small amounts of water may be added.

The inventive monophase hydraulic binder is made when the starting materials are ground in a mill, preferably under heightened shearing and pressure effects, for example in a disk vibration mill, a ball mill or a roller mill. The two reactants form a new material having an average connectedness. The second starting material will be depolymerized during co-grinding. The monophase binder thus made contains silicate building units which on the one hand are kept in a storable condition and on the other hand react hydraulically when the binder is mixed with water and lead to setting and solidification.

Generally, the first starting material is made by using one of the methods explained below:

In thermal manufacture at temperatures of up to 700° C. alkali/alkaline earth silicates are produced first by sintering alkali compounds, alkaline earth compounds and silicates together. The manufacture of $CaNa_2SiO_4$ from $CaCO_3$, $Na_2CO_3$ and $SiO_2$ will serve as an example:

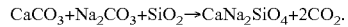

$CaCO_3 + Na_2CO_3 + SiO_2 \rightarrow CaNa_2SiO_4 + 2CO_2$.

In hydrothermal manufacture in pressurized autoclaves at 140° C. to 300° C. calcium-containing raw materials such as CaO, $CaCO_3$ or $Ca(OH)_2$ and silicon-containing raw materials such as quartz, silica, mica, feldspars, old concretes, glasses or slags are directly reacted with water or water vapour in a pressurized autoclave. It is possible to add a lye, preferably NaOH or KOH. It adjusts the pH value to between 11 and 13, increases the reaction speed and allows the use of slowly reacting silicon compounds. Next, the products are thermally dehydrated.

Quartz, quartz sand or another raw material, secondary raw material or a synthetic product serve as a second starting material (silicate carrier). Examples of these are silicate glasses, feldspars or slags.

Moreover, it is possible to form both starting materials together or that they are already present in mixed form:

a) In-situ formation: The first starting material is only formed during grinding and will then react with the excess or additional high-polymer second starting material.

b) Mixed starting materials: The two starting materials are already present together in a mixture and are directly reaction ground.

In another embodiment it is possible to manufacture composite binders by using blast-furnace slag, fly ashes, natural pozzolanas or conventional (Portland) cement. The latter is of particular interest if the cement made according to the invention reacts very quickly (reaction control) or if the mixture of the starting materials contains more calcium than required.

Hydration products made from an inventive hydraulic binder contain calcium silicate hydrates having a low molar ratio of Ca:Si and thus are chemically more stable than C—S—H gels in Portland cement stone because no portlandite is formed and the silicate building units have a higher connectedness as compared to Portland cement stone. Furthermore, no weathering-sensitive portlandite is present at the contact points of the binder to the aggregate in mortars or concretes so that no weakened points form in the join of mortars and concretes.

If the inventive binder contains less than 1% of $Na_2O$ the binder framework made therefrom is less sensitive to secondarily occurring alkali silica reactions so that alkali-sensitive aggregates may be used.

Below the invention will be explained in more detail by relating to an embodiment.

The starting materials were belite $\beta$-$Ca_2SiO_4$ and quartz, fine-grained, washed and calcined.

As an alternative, belite was manufactured according to DE 10 2005 037 771 A1 from a mixture of $CaCO_3$ and $SiO_2$ in a ratio of 2:1 by multiple sintering at 1,250° C. and intermediate homogenizing or by dehydration of hydrothermally manufactured $\alpha$-$Ca_2SiO_4 \cdot H_2O$ at 800° C.

Subsequently, belite was ground together with the quartz in a mass ratio of 1:1 (1.1 g each) in a disk vibration mill for 180 seconds. Apart from a change of the grain sizes the grinding process particularly caused a reaction between the starting materials which resulted in a hydraulic binder.

The BET surfaces of the starting materials were 0.5 m²/g for belite and 2 m²/g for quartz on average, while the mill product had a value of 1.7 m²/g. Grinding the starting materials separately with identical weighted portions and grinding period gave an average specific surface of 5.2 m²/g. Thus, the common grinding led to the formation of the inventive binder in a reaction, with the specific surface being reduced by a factor of about 3.

In the IR spectra it was observed that the Si—O stretching vibration of the belite at 844 cm$^{-1}$ and the (Si—O) stretching vibrations of quartz at 1078 cm$^{-1}$ strongly decrease due to the grinding. Instead, broad bands having a center of gravity at 936 cm$^{-1}$ and 1100 cm$^{-1}$ occur; the band at 936 cm$^{-1}$ proves the formation of a slightly polymerized calcium silicate.

This finding was confirmed by $^{29}$Si solid state NMR studies. Belite has merely $Q^0$ silicate species. After the grinding a $Q^3$ and a broad $Q^2$ signal were newly present. The $Q^4$ signal of quartz as well as the $Q^0$ signal of belite clearly decreased.

The results of the X-ray diffraction also prove the reaction and show merely a broad increased background in the range of 25° to 35° 2Θ(Cu—K$_\alpha$ radiation) in the hydraulic binder.

The hydration of the hydraulic binder was followed by means of a thermal-conductivity calorimeter. Due to the heat of wetting, a maximum of the heat release occurred a few seconds after the proportioning of the mixing water. Then the heat release subsided almost completely in order to finally rise after a minimum at about 25 minutes to a second maximum after about 10 hours. In the course of the next 100 hours the heat release slowly subsides. While the reaction is combined with less heat release than the reaction of Portland cements, a considerable strength is reached after a few hours already. At a ratio of water to binder of 0.3 and by adding three parts of sand to one part of binder a compressive strength of 20 N/mm² was exceeded after 28 days.

The $Q^2$ NMR signal, which proves the occurrence of the C—S—H phase, dominated the spectrum of the set building material. A clear intensity of the reflection in the powder diffractogram at 0.305 nm and 0.28 nm as well as the generation of a broad reflection between 1.7 nm and 1.15 nm could be recognized. This proves that a calcium silicate hydrate is formed in the set building material. The position of the reflections shows that the calcium silicate hydrate has a lower molar ratio of Ca:Si than C—S—H gel made from Portland cement.

Finally, the (Si—O)-stretching vibration of the C—S—H phase was found at 970 cm⁻¹ in the IR spectrum, i.e. shifted to higher wave numbers, which corresponds to a higher connectedness. Furthermore, a new band could be recognized at 668 cm⁻¹. It corresponds to an Si—O—Si bending vibration, which is further proof of the occurrence of a highly polymeric C—S—H phase.

We claim:

1. A monophase amorphous hydraulic binder containing silicon, calcium and oxygen atoms in an arrangement comprising silicate building units having an average connectedness of at least $Q^1$, with none or a part of the calcium atoms being substituted for by a metal atom $M[6]^{x+}$ sixfold or higher coordinated with oxygen and/or none or no more than 45 atomic percent of the silicon atoms being substituted for by a metal atom $M[4]^{y+}$ tetrahedrally coordinated with oxygen, the molar ratio of $$[CaO+(x/2)\cdot(M[6]^{x+}O_{x/2})]:[SiO_2+M[4]^{y+}O_{y/2}]$$

having a value of 0.2 to 1.5 and the binder having less than 3.5% by weight of water.

2. The monophase hydraulic binder of claim 1, said molar ratio of $$[CaO+(x/2)\cdot(M[6]^{x+}O_{x/2})]:[SiO_2+M[4]^{y+}O_{y/2}]$$

having a value of 0.3 to below 1.5.

3. The monophase hydraulic binder of claim 1, with a part of the calcium atoms being substituted for by Na, K, Li, Mg, Sr, Ba, Mn, Fe[+II] or Al[+III] atoms.

4. The monophase hydraulic binder claim 1, wherein no more than 45 atomic percent of the silicon atoms are substituted for by Al, Ge, B, P, Fe, Be or Ti atoms.

5. The monophase hydraulic binder of claim 1, which reacts to hydrates after adding water, wherein more than 50% by weight of the hydrates are calcium silicate hydrates having a molar ratio of $$[CaO+(x/2)\cdot(M[6]^{x+}O_{x/2})]:[SiO_2+M[4]^{y+}O_{y/2}]$$

of smaller than 1.5.

6. A mixture containing a monophase hydraulic binder of claim 1.

7. The mixture of claim 6, containing at least 10% by weight of the monophase hydraulic binder.

8. A method for manufacturing a monophase hydraulic binder of claim 1 by
reaction grinding a first starting material containing calcium, silicon and oxygen atoms present in the form of silicate building units having a connectedness of $Q^0$ to $Q^2$, with a second starting material in the form of a solid silicate raw material having a connectedness of the silicate building units of $Q^3$ to $Q^4$, and,
as long as the water content is 3.5% by weight or higher, drying the monophase hydraulic binder to a water content of less than 3.5% by weight.

9. The method for manufacturing a monophase hydraulic binder of claim 1 by
reaction grinding a material, which forms a first starting material during reaction grinding and contains calcium, silicon and oxygen atoms present in the form of silicate building units having a connectedness of $Q^0$ to $Q^2$, with a second starting material in the form of a solid silicate raw material having a connectedness of the silicate building units of $Q^3$ to $Q^4$, and,
as long as the water content is 3.5% by weight or higher, drying the monophase hydraulic binder to a water content of less than 3.5% by weight.

10. The method for manufacturing a mixture according to claim 6 by
reaction grinding raw materials containing further materials in addition to the first starting material of claim 8 or in addition to the material which forms the first starting material during reaction grinding according to claim 9, or in addition to the second starting material of claim 8 or 9, and,
as long as the water content of the monophase hydraulic binder is 3.5% or more, drying the mixture until the monophase hydraulic binder contained therein has a water content of less than 3.5% by weight.

11. The method of claim 8, wherein quartz or quartz sand are used as the second starting material.

12. The method of claim 8, wherein the first and the second raw materials are present together in one material.

13. The method of claim 10, wherein Portland cement clinker is used as the first starting material.

14. A building material, manufactured by setting the monophase hydraulic binder of any one of claims 1 to 5 or the mixture of claim 6 or 7 with water and subsequent hardening.

15. The building material of claim 14, containing alkali-sensitive additives.

16. The monophase hydraulic binder of claim 1, wherein at least a portion of the silicon atoms are substituted for by Al, Ge, B, P, Fe, Be or Ti atoms, and
wherein the at least a portion is no more than 45 atomic percent.

17. The monophase hydraulic binder of claim 1, wherein at least a portion of the silicon atoms are substituted for by Al atoms, and
wherein the at least a portion is no more than 45 atomic percent.

* * * * *